United States Patent [19]
Claxton et al.

[11] 3,763,354
[45] Oct. 2, 1973

[54] RESISTANCE SETTING APPARATUS

[75] Inventors: William E. Claxton, Mogadore; Harold C. Holden, Green Twp., Summit County, both of Ohio

[73] Assignee: The Firestone Tire & Rubber Company, Akron, Ohio

[22] Filed: July 28, 1971

[21] Appl. No.: 166,793

[52] U.S. Cl.235/61.11 A, 235/61.11 R, 235/61.12 R, 235/193, 340/149 A, 340/347 DA

[51] Int. Cl...... G06k 7/06, G06k 19/06, G06g 7/58, G08c 9/08, H04q 3/58

[58] Field of Search.............. 235/61.11 A, 61.11 R, 235/61.12 R, 61.11 D, 193, 61.11 H, 61.6 E, 61.11 C, 61.11 B; 340/149 A, 347 DA; 200/46

[56] References Cited

UNITED STATES PATENTS

| | | | |
|---|---|---|---|
| 3,210,754 | 10/1965 | Roberts | 340/347 DA |
| 2,718,634 | 9/1955 | Hansen | 340/347 DA |
| 3,133,233 | 5/1964 | Peterson | 340/347 DA |
| 2,784,369 | 3/1957 | Fenemore | 340/347 DA |
| 2,993,202 | 7/1961 | Halonen | 340/347 DA |
| 3,628,004 | 12/1971 | Claxton | 235/193 |
| 2,935,923 | 5/1960 | Baumbach | 235/61.11 A |
| 2,995,691 | 8/1961 | Kennard | 235/61.11 A |
| 3,247,363 | 4/1966 | Jenkins | 235/61.11 A |
| 3,530,281 | 9/1970 | Smeiman | 235/61.11 H |
| 3,134,254 | 5/1964 | Richard | 340/149 A |
| 3,315,044 | 4/1967 | Newsome | 200/46 |
| 3,470,359 | 9/1969 | Esterly | 235/61.11 A |
| 3,644,715 | 2/1972 | Holderith | 235/61.11 A |
| 3,515,339 | 6/1970 | McEwan | 200/46 X |

*Primary Examiner*—Daryl W. Cook
*Assistant Examiner*—Robert M. Kilgore
*Attorney*—S. M. Clark et al.

[57] ABSTRACT

A resistance setting apparatus is disclosed in the form of a card reader to read a standard Hollerith IBM card which has twelve rows of eighty columns. The desired variable resistance values are pre-established by being pre-punched on the card, which holes are then read simultaneously by the feeler contacts. The feeler contacts are connected to a resistor column to select from one to 10 resistors in three different decade gruops and these are connected to the input of a feedback amplifier to establish the gain of the amplifier, and hence, the effective resistance thereof which is accurate to three decimal places. The foregoing abstract is merely a resume of one general application, is not a complete discussion of all principles of operation or applications, and is not to be construed as a limitation on the scope of the claimed subject matter.

8 Claims, 5 Drawing Figures

INVENTORS
WILLIAM E. CLAXTON,
& HAROLD C. HOLDEN

INVENTORS
WILLIAM E. CLAXTON,
& HAROLD C. HOLDEN

PATENTED OCT 2 1973 3,763,354

INVENTORS
WILLIAM E. CLAXTON,
& HAROLD C. HOLDEN

INVENTORS
WILLIAM E. CLAXTON,
& HAROLD C. HOLDEN

RESISTANCE SETTING APPARATUS

RELATED APPLICATIONS

This application relates to improvements upon the Claxton and Holden application Ser. No. 840,622, filed July 10, 1969, entitled "COMPUTER OPTIMIZER", now U.S. Pat. No. 3,628,004, issued Dec. 14, 1971.

BACKGROUND OF THE INVENTION

A special purpose analog computer has been disclosed in the parent application for optimization of the ingredient levels of a chemical compound as one example of use. As an example, the physical characteristics of a particular rubber blend may be closely approximated by a general empirical or mathematical model equation expressed in first and second order terms of the ingredients. By analysis of raw experimental data relating to the physical characteristics of interest, a different set of influence coefficients for the general equation terms may be determined for each physical characteristic, whereby a number of special model equations are obtained. In one example of the invention an eight channel analog system is provided for simultaneously evaluating eight special model equations, expressed in terms of five ingredients. The set of influence coefficients for the terms of each special model equation are scaled to values less than unity and are dialed by means of 10 turn potentiometers upon a bank of 160 potentiometers of the analog computer. Five variable factor dials are provided to control the voltage level or desired value of the ingredients which may be altered to simulate various combinations of ingredients. The analog computer then instantly computes eight outputs which represent the response values of the eight physical characteristics for the selected blend of ingredients. A four oscilloscope readout is provided utilizing the eight outputs and is programmed so that an ideal blend results in the convergence of the four oscilloscope beams toward the center of the readout array. The computer may have an automatic search mode of operation to continuously vary the levels of the variable factors to automatically search through a range of factor levels to attempt to locate that combination of blend of ingredients which produces the best response. Also a combination search may be provided wherein the variable factor levels are periodically changed only in the direction to achieve optimum results and thus the optimum blend of constituents may be determined by this combination search circuit.

The parent application discloses a special purpose analog computer for use in design investigations involving variable factor systems. Within the chemical industry and rubber industry in particular, such plural factor design investigations have been performed at least in the areas of compounding, textiles, polymerization, and tire wear and noise analysis.

Particularly in the design of rubber compounds great difficulty has been encountered in the speedy determination of optimum ingredient blends, capable of yielding suitable physical characteristics while yielding minimum cost and production time factors. Some compounding problems arise directly from the relatively large number of ingredients in the typical blend and/or from the high criticality of the ingredients. Thus many service compounds now contain seven, eight or even a larger number of basic ingredients. Slight variations in the levels of some of the ingredients may evoke drastic changes in the physical characteristics of the rubber product or in the cost and time factors involved in its production.

Other perhaps more severe difficulties in designing or analyzing a rubber blend arise from interactions between the various ingredients. Thus, the final effect upon the physical characteristics of a blend caused by a variation in the level of one ingredient may in turn depend upon the level of a second ingredient contained in the blend. Clearly any analysis of data relating to test results of compounding experiments is greatly complicated by such interaction effects.

Older methods for designing rubber compounds attempted to overcome the above problems through the use of a large number of experiments. Thus, a rubber blend under study was repeatedly compounded and tested, with the level of only one ingredient being changed at a time. The increments of change were made small and the changes in the ingredient were plotted against the results of test measurements on the physical characteristics or reponses of interest. If a large number of experiments were performed and sufficient data accumulated and analyzed, a near optimum compound design could be determined. However, the obvious time involvement and inefficiency of such methods caused the compounder to attempt other approaches, which led to the development of the present invention.

Problems similar to those outlined above have generally plagued the designed studying of other plural variable systems within the rubber industry, as well as in other industries as diverse as agriculture and petroleum. Consequently, design studies performed in these areas are also susceptible of solution by using the invention described herein.

The parent application disclosure of a special purpose analog computer is designed for the evaluation of statistically designed experiments which have become increasingly popular as an aid to optimization in the rubber industry as well as in other technical areas. The basic techniques utilized in carrying out designed experiments depend upon setting up special mathematical model equations which will closely approximate the behavior of the responses of interest in terms of the factors under study. With respect to rubber compounding it should be apparent that the factors under study would be the ingredients in the blend; while the responses of interest would be physical characteristics such as ultimate elongation, modulus, running temperature, per cent steel ball rebound, ring tearing resistance and chipping severity, or production characteristics relating to cost and production time.

It has been determined that all the physical properties of a rubber blend may be closely approximated by a general empirical model equation of second order terms. Such an equation of the physical property or response $Y_A$ in terms of two ingredients or variable factors $x_1$, $x_2$ would take the form $$Y_A = a_o + a_1x_1 + a_2x_2 + a_{11}x_1^2 + a_{22}x_2^2 + a_{12}x_1x_2 \quad (1)$$

where $a_o$, $a_1$, $a_2$, $a_{11}$, $a_{22}$ and $a_{12}$ represent influence coefficients which are unique and constant for the response $Y_A$.

It is possible to establish the numerical values of the influence coefficients by known techniques, for example, by the analysis of raw data relating to the physical characteristics $Y_A$ measured for various values of $x_1$ and $x_2$, utilizing a general purpose digital computer or a desk calculator. Once the influence coefficients have been determined, use of the special purpose analog computer enables the solution of the special model equation (1) to instantly evaluate $Y_A$ for any desired values of $x_1$ and $x_2$.

The analog computer of the parent case generally comprises an assembly of function generators or variable factor level generators which receive reference voltages as inputs and are interconnected with an array of influence coefficient potentiometers to develop a plurality of proportional output currents corresponding, respectively, to the terms of the special model equation. These individual currents are collected by switching circuits on positive and negative buses and summed by a pair of amplifiers to produce an output current proportional to the value of the response $Y_A$. Thus, any special model equation may be solved merely by scaling its influence coefficients to values less than unity and entering them directly on the dials of the appropriate coefficient potentiometers; and then by manipulating the control knobs or dials of the variable factor level generators to sweep through the desired range of levels of $x_1$ and $x_2$, the special model equation is evaluated in terms of the respone under consideration.

Generally a certain range of values of interest are known for each variable factor. The center of this design range is usually taken as a normal condition and factor levels are measured in positive increments above and negative increments below the center level. Thus in setting up a model equation on the blend optimizer of the parent case, the variable factors may take either positive or negative values. This is accounted for in the blend optimizer by providing both positive and negative reference potentials and manually controlled switches to selectively connect a voltage of the proper input polarity to the instant variable factor potentiometer. It should also be apparent that an equal mathematical probability exists that any one influence coefficient will be positive or negative. The negative influence coefficients are accounted for in the parent case blend optimizer by manually controlled switches which automatically collect the positive coefficient terms on a positive amplifier bus and the negative coefficient terms on a negative amplifier bus.

The parent case analog computer is designed to evaluate second order functions in terms of as many as five variable factors and has eight channels to simultaneously accommodate as many as eight special model equations representing eight responses designed in terms of the five variable factors. However, the teaching of the present invention is not limited to the above configuration. Rather, by following the teaching of the present invention, it would be easily possible to construct a variable resistance setting apparatus for many forms of analog computers or hybrid computers which can be used to eliminate the tedious and often inaccurate manual setting of potentiometers or other variable resistors.

In the parent case there are two panels of 80 potentiometers each. Ten turn potentiometers were used in order to obtain the necessary accuracy and this means that up to 160 potentiometers must be rotated as much as ten turns in order to accurately set the 160 influence coefficients in the eight special model equations. This hand setting of the values to correspond to these coefficients of the response equations is time-consuming, particularly if a set of response equations is rerun at different times. Additionally, it is a source of errors because one may bump a potentiometer knob after it has previously been set, and not notice that it was moved from its previous adjustment. Also manual errors in observing the correct setting of each potentiometer is a distinct possibility.

The prior art has made a previous attempt to solve this problem by using card readers to introduce coefficients into analog computers. It has previously been proposed in Walker U. S. Pat. No. 2,543,650 to use the feeler contacts of the card reader, when extending through a hole in the card, to cut resistances in an out of the computer. However, this scheme was cumbersome in that it required five different fractional source voltages both plus and minus and it also required three different card columns for setting each coefficient. Another prior art approach utilizing a card reader to introduce coefficients, was the Jacobi U. S. Pat. No. 2,740,584, wherein a separate card and card reader was required for each equation and further required the use of relays in the card reader.

The prior art has also utilized a card reader to select different voltages in Hedger et al., U. S. Pat. No. 2,902,607. However, this card reader generated different voltages rather than selected a variable resistance and it was used as a function generator. It required two separate constant voltage sources and also required that the voltage sources be of opposite polarity.

None of these prior art schemes are considered to be economically feasible to replace coefficient potentiometers in modern analog or hybrid computer installations. One, because of the plurality of card readers needed and another because of the relays required with the card reader.

Accordingly, an object of the invention is to provide a resistance setting apparatus which obviates the disadvantages of the prior art.

Another object of the invention is to provide a variable resistance setting apparatus which utilizes a standard card reader reading an 80 column card to set up 80 different resistance values.

Another object of the invention is to provide a resistance setting apparatus which may economically replace manual potentiometers.

Another object of the invention is to provide a resistance setting apparatus which utilizes a ladder network or column of resistors which is selectively connected by the contacts in a column in the card reader to select a variable resistance.

Another object of the invention is to provide a resistance setting apparatus which utilizes one or more contacts in a column of contacts in the card reader to determine the positive or negative sign of the variable resistance value.

Another object of the invention is to provide a resistance setting apparatus of a card reader to read a card wherein a column of resistors which may be selectively connected in the circuit is divided into three decade groups in order to select a resistance value accurate to three decimal places.

SUMMARY OF THE INVENTION

The invention may be incorporated in a variable resistance setting apparatus, comprising, in combination, a data reader to read a pre-established data member establishing a plurality of desired resistance values, sensing means in said data reader arranged in columns corresponding to the columns on the data member to sense the difference between the gate open and gate closed conditions on the data member, a plurality of resistor columns each containing a plurality of resistors, said plurality of resistors of each resistor column being subdivided into first, second and third decade groups, the resistors in said second decade group having resistive values in the order of one decade higher than those in said first decade group and in the order of one decade lower than those in said third decade group, a resistor column for each of the plural sensing means columns in the data reader, and means connecting the individual resistors in a given resistor column to a respective one of a column of sensing means to establish a variable resistance determined by the cumulative value of the selected ones of the resistors in that resistor column.

Other objects and a fuller understanding of the invention may be had by referring to the following description and claims, taken in conjunction with the accompanying drawing.

DESCRIPTION OF THE PREFERRED EMBODIMENT

Figure 1:
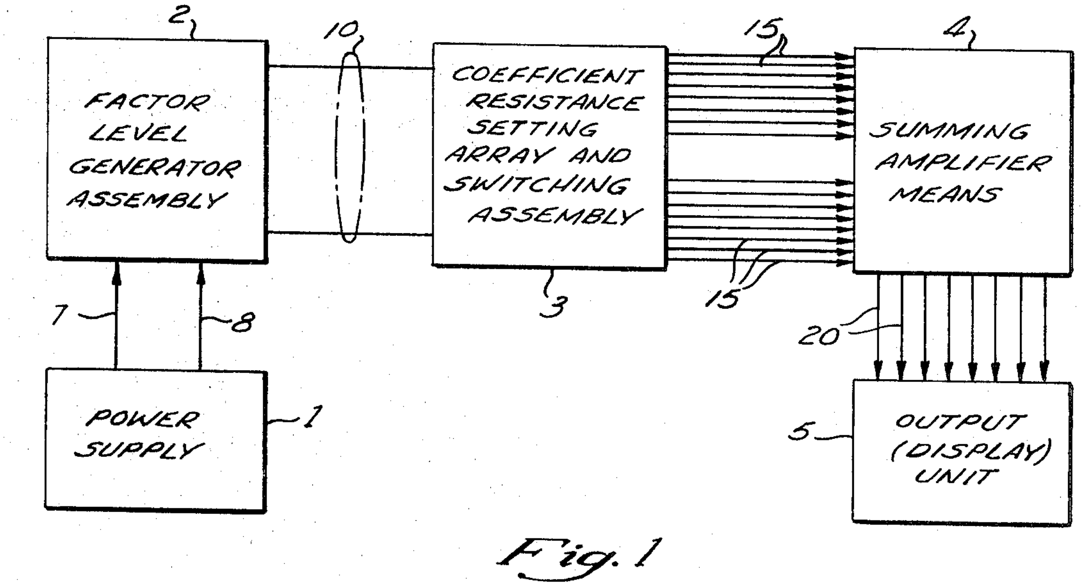
FIG. 1 is a block diagram of an analog computer with which the present invention may be used.

The preferred embodiment of the invention is a variable resistance setting apparatus which is usable with a special purpose analog computer capable of evaluating equations expressed as a function of five variable factors. Consequently it is important to consider that the special second order model equation for a response $Y_A$ as a function of five variable factors $x_1 - x_5$ may be given as $$Y_A = a_0 + \sum_{i=1}^{5} a_i x_i + \sum_{i=1}^{5} a_{ii} x_i^2 + \sum_{i=1}^{4} \sum_{\substack{j=2 \\ j \geq i}}^{5} a_{ij} x_i x_j \quad (2)$$

Rewriting equation (2) in terms of changes from the base level value it would appear as:

$$\Delta Y_A = Y_A - a_o = \Sigma a_i x_i + \quad (3)$$

where the coefficient $a_o$ is merely a constant representing the predicted value of response $Y_A$ at the base level ($x_i + o$, $i = 1$ . . 0.5) and need not appear explicitly in the programming of the equation.

It should be apparent that twenty individual terms would be added on the right hand side in order to complete equation (3). These would include flue main effect terms having single subscript coefficients ($a_1x_1$, $a_2x_2$. . . $a_5x_5$); five curvature terms having like double subscript coefficients ($a_{11}x_1^2$, $a_{22}x_2^2$ . . . $a_{55}x_5^2$); and ten interaction terms having double unlike subscripts ($a_{12}x_1x_2$, $a_{13}x_1x_3$ . . . $a_{45}x_4x_5$).

Special second order model equations for seven other responses $Y_B - Y_H$ would appear in a form similar to equation (3) the only difference being the appearance of different constant influence coefficients as shown below:

$$\begin{aligned} Y_B &= b_o + \Sigma b_i x_i + \Sigma b_{ii} x_i^2 + \Sigma\Sigma b_{ij} x_i x_j \\ Y_C &= c_o + \Sigma c_i x_i + \Sigma c_{ii} x_i^2 + \Sigma\Sigma c_{ij} x_i x_j \\ Y_D &= d_o + \Sigma d_i x_i + \Sigma d_{ii} x_i^2 + \Sigma\Sigma d_{ij} x_i x_j \\ Y_E &= e_o + \Sigma e_i x_i + \Sigma e_{ii} x_i^2 + \Sigma\Sigma e_{ij} x_i x_j \\ Y_F &= f_o + \Sigma f_i x_i + \Sigma f_{ii} x_i^2 + \Sigma\Sigma f_{ij} x_i x_j \\ Y_G &= g_o + \Sigma g_i x_i + \Sigma g_{ii} x_i^2 + \Sigma\Sigma g_{ij} x_i x_j \\ Y_H &= h_o + \Sigma h_i x_i + \Sigma h_{ii} x_i^2 + \Sigma\Sigma h_{ij} x_i x_j \end{aligned} \quad (4)$$

It should be apparent that the numerical values for the constant influence coefficient terms for the special model equations above can be determined by the known analytical techniques previously mentioned. Furthermore, once these coefficients have been calculated, evaluation of the special equations is more susceptible of the use of a special purpose analog computer than a general purpose digital computer.

FIG. 1 shows a block diagram of a special purpose analog computer designed to simultaneously evaluate the special model equations set forth above.

Referring now to FIG. 1 a block diagram of the special purpose computer or blend optimizer of the parent case is shown comprising a power supply 1, a function generator or factor level generator assembly 2, a coefficient resistance setting array 3, summing amplifier means 4, and an output or display unit 5.

Power for the summing amplifier unit and display unit is furnished from the supply 1 on line 7. In addition, supply 1 provides positive d.c. reference potentials and negative d.c. reference potentials to the potentiometer assembly 2 via line 8.

Assembly 2 is comprised of a plurality of manual knobs corresponding in number to the variable factors which are to be evaluated by the blend optimizer. Each knob controls the voltage level proportional to a factor as established by the function generator. This may be an operational amplifier connected as an integrator to generate a ramp voltage. The ramp voltage may be selectively energized by either a positive or negative reference voltage and the factor level generator sweeps through an adjustable range of voltages.

The factor level generator assembly 2 is arranged to develop output voltages representative of the $x_i$, $x_i^2$ and $x_ix_j$ terms of equation (2) in any well known manner.

The coefficient resistance setting array 3 is comprised, in the parent case, of a plurality of individually mounted and operated potentiometers, a single pot being provided for each influence coefficient of each model equation to be evaluated by the computer optimizer. For example, evaluation of a five variable response equation containing twenty terms would require twenty pots and an eight channel system for simultaneously evaluating eight such model equations would require one hundred sixty coefficient pots. This involves much manual labor and time to set these coefficients, also the possibility of error. Accordingly, the present invention shown in FIGS. 1, 2, 4 and 5 is an improvement.

The output voltages from the factor level generators of assembly 2 are furnished as inputs to the varible resistances of array 3 along line 10. Each of the variable resistances of array 3 functions to multiply one of the voltages representing an $x_i$, or $x_i^2$ or $x_ix_j$ term by an influence coefficient as preset by that variable resistance. Thus, the output of a variable resistance of array 3 is a voltage which represents the absolute value of a particular term of one of the model equations being evaluated. Furthermore, the polarities of the output voltages from the variable resistances of array 3 are predetermined to be positive or negative, as required to correspond with the sign of the terms they represent, in a manner to be further explained. The output voltages representing positive terms may be automatically collected as positive output values by means of a sign switching assembly as in the parent case; while the output voltages representing negative terms may be automatically collected as negative output values by the same means.

In the present invention, the positive or negative sign is automatically determined by the card and card reader. A summing amplifier 4 is provided to receive outputs on lines 15 for each of the eight channels of the optimizer and are interconnected to combine the positive term voltages and the negative term voltages in proper relationship. The outputs of the respective summing amplifiers are then made available on a plurality of lines 20 to operate the display or output unit 5 in a number of alternative modes.

Figure 3:
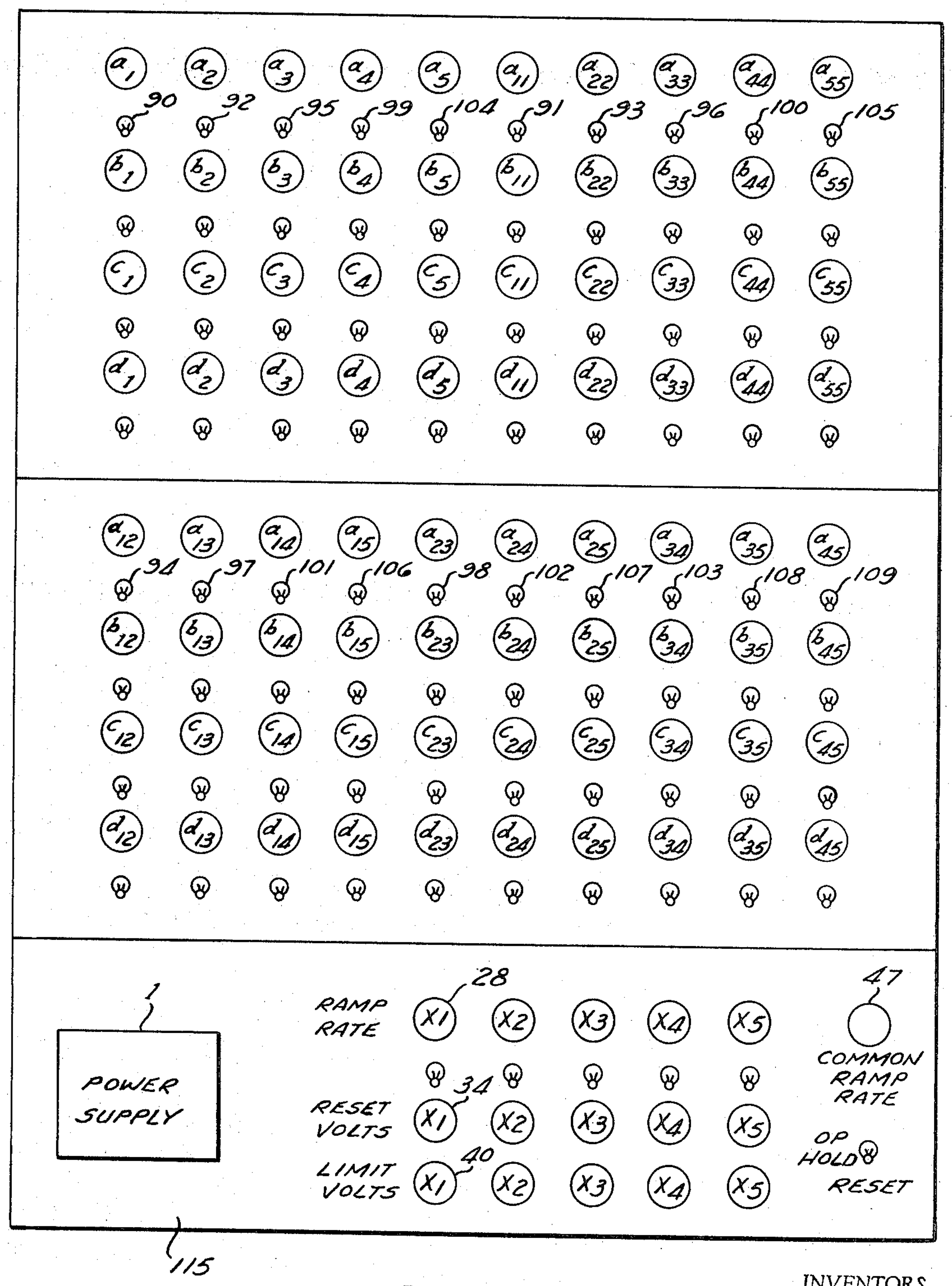
PRIOR ART Fig. 3
FIG. 3 is a representation of a potentiometer panel of the prior art parent case showing 80 manual potentiometers.

FIG. 3 shows the panel of 80 potentiometers used to set the influence coefficients in the parent case analog computer. It shows 20 potentiometers $a_1$ through $a_{45}$ to set the 20 influence coefficients of one of the eight equations. Switches 90 through 109 immediately below these potentiometers were previously required to set either a plus or minus value for that particular potentiometer or variable resistance. Now by the present invention, these switches and potentiometers are eliminated. At the bottom of FIG. 3 the power supply number 1 is shown together with five potentiometers 28 for setting the ramp rates of $x_1$ through $x_5$ and these set the factor levels. The various factor levels may be provided by generators which are function generators. In the parent case these are provided by an integrator acting as a ramp generator to generate a linear ramp starting at a negative value and capable of going through zero to a positive value. By ramping through all the possible values from a netative to a positive, the analog computer is able to traverse through all possible numerical values for each response equation. The output unit may be a series of four oscilloscopes with a pair of the lines 20 going to each oscilloscope. One of the pair would be to the vertical deflection plates and the other of the pair would be to the horizontal deflection plates. The result is that the output of all eight equations is displayed on the output display unit 5. An automatic search mode of operation continuously varies the levels of the variable factors $x_1$–$x_5$ to automatically search through a range of factor levels to attempt to locate that combination of blend of ingredients which produces the best response, as one example. The four oscilloscope readout provides that when the ideal blend is achieved, this results in the convergence of the four oscilloscope beams toward the center of the readout array 5 and thus it may be visually observed that this best solution to the problem has been achieved.

In FIG. 3 other controls are shown on the front of the main console 115. For example, a common ramp rate potentiometer 47 may be provided to establish a common linear ramp rate for all of the factor levels. Also reset volt potentiometers 34 for the factors $x_1$–$x_5$ may be provided and also limit potentiometers 40 to limit the ramp voltage may be provided for each of the factor levels $x_1$–$x_5$.

Figure 2:
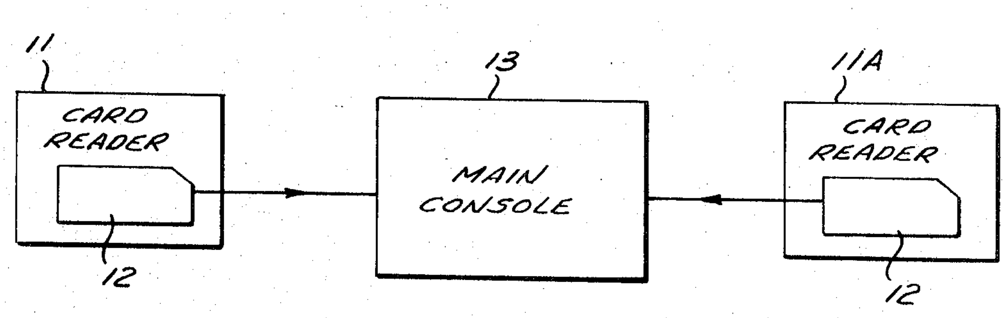
FIG. 2 is a block diagram of the variable resistance setting apparatus of the invention.
Figure 4:
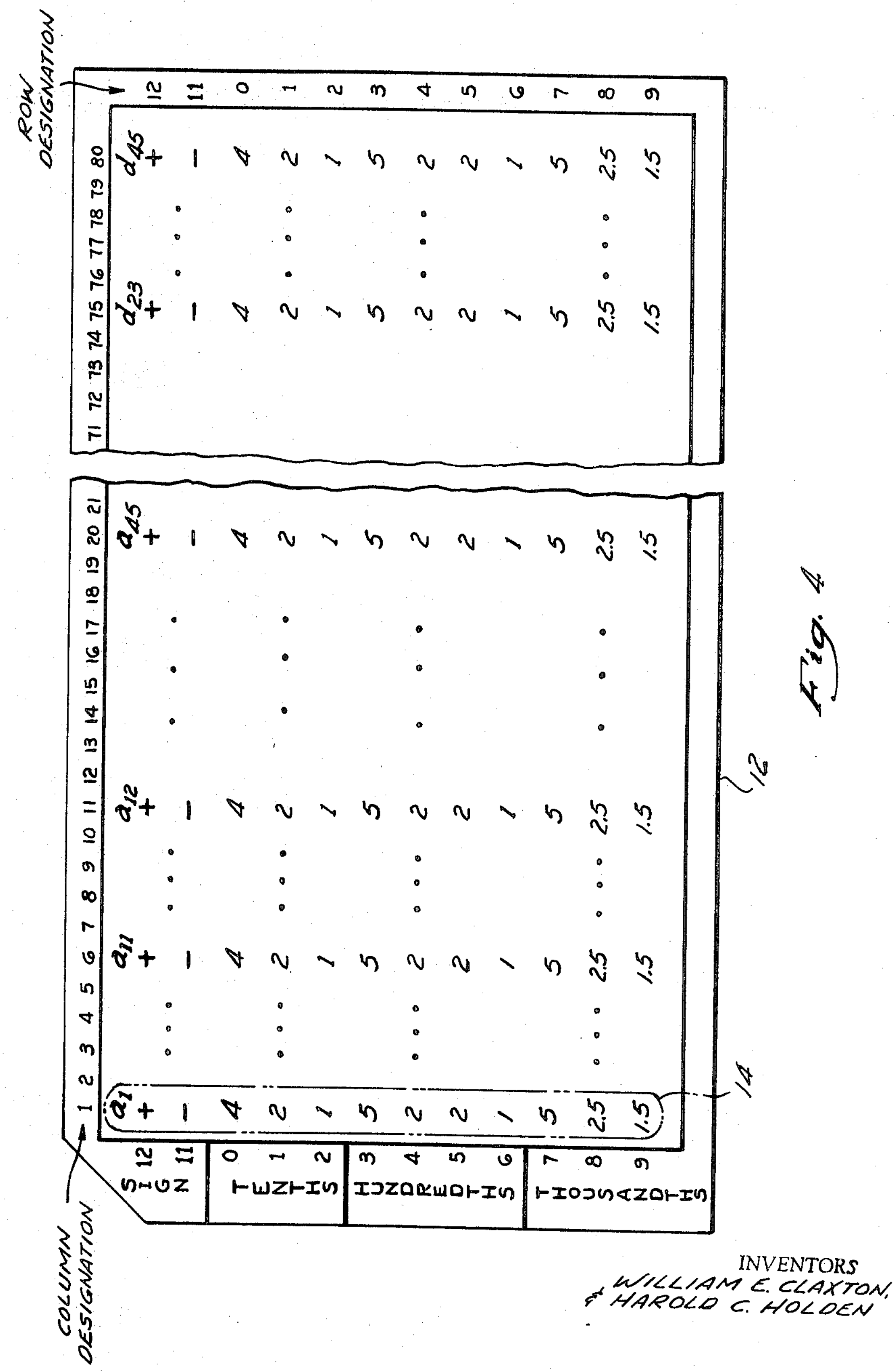
FIG. 4 is a plan view of a standard card into which holes may be punched to pre-establish the desired resistance values; and, FIG. 5 is a schematic diagram of the variable resistance setting apparatus of the invention.

Referring to FIG. 2 the main console 13 has been shown and this may be similar to the console 115 of FIG. 3 but may be greatly simplified because it need not have the 80 or 160 potentiometers and switches thereon. Card readers 11 and 11a may be provided each to read a standard Hollerith IBM card 12, with the card readers being connected to the main console 13. The card reader may be any of a number of standard card readers currently available on the market, for example, that made by AMP Incorporated, Model 2981A. This particular card reader uses metal feeler contacts as sensing means to determine if a hole or aperture is at one of the many possible hole locations in the card 12. FIG. 4 is a plan view of such a card 12 and in the preferred embodiment this may be a standard IBM card which has 12 rows and 80 columns for a total of 960 possible hole locations.

In this example of eight equations, there are 20 influence coefficients of $a_1$–$a_{45}$ and these are represented by the first twenty columns on this IBM card 12. This same 80-column card would then accommodate the influence coefficients $b$, $c$ and $d$ as well as the influence coefficients $a_1$–$a_{45}$. Other card readers may be used, for example, some which are photoelectric devices and thus do not have actual metallic contacts but they all have some form of sensing means to indicate the presence or absence of a hole. The presence of a hole and hence the closing of an electrical switch is defined as a gate closed condition and the absence of a hole or the opening of a switch is defined as a gate open condition. By means of this card reader 11 or 11*a*, the influence coefficients are automatically set in the main console 13 for use in the analog computer. In FIG. 4 the first column on the card 12 has been indicated by reference numeral 14 and this column contains a pattern of punched holes which encodes the influence coefficient that was previously set by adjusting the potentiometer $a_1$ of the potentiometer array of FIG. 3. The second column contains the holes encoding the coefficient for the second influence coefficient $a_2$, the third column contains holes encoding the coefficient $a_3$, and so on, each successive column containing the successive coefficients of the response equation. In this example, there are 20 terms for the first equation, so it would take 20 columns to establish the influence coefficients therefor. In this IBM card 12 of FIG. 4, there are the standard number of 12 rows. Following the standard IBM card row designation as indicated on the right-hand margin of the FIG. 4, these rows represent 12, 11 and 0–9, respectively. Now as indicated on the left end of FIG. 4, rows 0–9 are divided into three decade groups of tenths, hundredths and thousandths, respectively.

Figure 5:
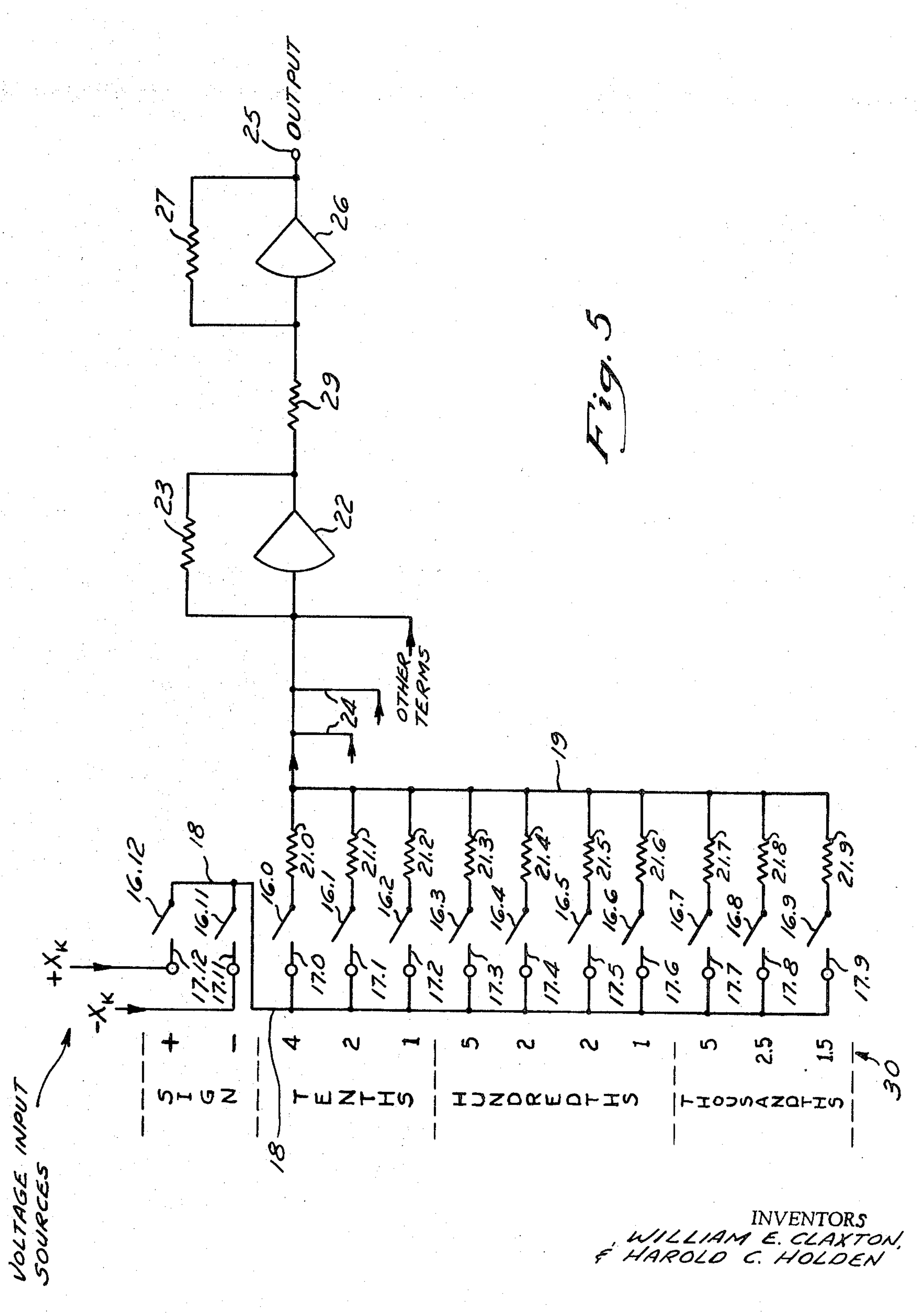

FIG. 5 shows the circuit controlled by this first row 14 of the IBM card 12 so as to introduce the coefficient $a_1$ or more generally $a_k$, which is to multiply the variable $x_k$ in the analog computer. A column of 12 feeler contacts or sensing means 16 are provided and these are designated 16.0, 16.1, 16.2 and on up through 16.12. These feeler contacts are in the card reader 11 or 11*a* and bear upon the first column 14 of the card 12 at the respective positions in the row designations 0 through 9 and 11 and 12, respectively. If a hole is present at a particular location, then the contacts are closed and the feeler contacts 16 make contact with a stationary contact 17. For conformity, the stationary contacts 17 are also designated 17.0 through 17.9, 17.11 and 17.12. Each of the stationary contacts 17.0 through 17.9 is connected to a conductor bus 18 which is connected to the feeler contacts 16.11 and 16.12. Stationary contact 17.12 is connected to the positive voltage plus $x_k$ and the stationary contact 17.11 is connected to the negative voltage $x_k$. These are voltage source terms, and as an example may be simply the ramp voltages or products thereof of either polarity, from the factor level generators $x_1$ and $x_2$, as an example. Accordingly, the contacts 16.11 and 16.12 determine the polarity of the voltage applied on the conductor bus 18. A hole at the appropriate 11th or 12th row on the card 12 thus determines automatically the plus or minus sign for that particular influence coefficient.

A second conductor bus 19 is connected to a ladder network or column of resistors 21. There are ten such resistors 21 in this preferred embodiment and they have been designated with the reference numeral 21.0 through 21.9, respectively. Accordingly, depending upon which of the feeler contacts 16–17 are closed, different resistances 21.0 through 21.9 are connected in parallel between the conductor buses 18 and 19. The conductor bus 19 is connected to the inverting input of a summing amplifier 22 which is connected as a feedback amplifier because of a feedback resistance 23. The various selected resistors of the resistor column 21.0 through 21.9 collectively act as an input resistance to the summing amplifier 22. The amplifier 22 is designated as a summing amplifier because it sums a number of terms, in this preferred embodiment a total of 20 $a_k$ $x_k$ terms with 19 other terms coming in on conductors 24 to the input of this amplifier 22. The output from the amplifier 22 is fed to an output terminal 25 by means of an inverter 26. This inverter again inverts the sign to have the output 25 at the same polarity as the input conductor bus 19. The inverter 26 may be a unity gain inverter by having the feedback resistance 27 of the same value as the input resistance 29. This output 25 may be one of the lines 20 as shown in FIG. 1 and the summing amplifier 22 may be one of the summing amplifier means 4 of FIG. 1. For eight response equations there will be a total of eight amplifier pairs 22 and 26 in the summing amplifier means 4, each having an output on one of the lines 20.

The resistor column 21 is capable of establishing a variable resistance to replace the potentiometers of the patent case. This resistor column 21 is divided into three groups, which in this preferred embodiment are decade groups. These have been designed at the left side of FIGS. 4 and 5 as tenths, hundredths and thousandths, respectively. A column 30 on FIG. 5 indicates the value placed on each of the ten resistors in this resistor column. This is not the Ohmic value, rather it is the value which is obtained at the output 25 when that particular resistor is selected by the sensing means 16–17. In this preferred embodiment the Ohmic values of the resistors 21.0 through 21.9 respectively, are 12.5 kilo-ohms, 25K, 50K, 100K, 250K, 250K, 500K, 1 megohm, 2M and 3.33M., respectively. The values of these resistances are so chosen as to scale the voltage, or the current through the summing amplifier 22, by the values 0.4, 0.2, 0.1, 0.05, 0.02, 0.02, 0.01, 0.005, 0.0025 and 0.0015, respectively. By combining these resistors in various combinations in parallel by punching appropriate holes in the cards 12, it is possible to multiply the voltage on the conductor bus 18 by plus or minus any fraction in reasonably small steps and to supply the corresponding current to the conductor bus 19 to be summed, along with all other terms of the equation from conductors 24, by the summing amplifier 22.

Table A correlates the resistance values obtained by the three decade groups tenths, hundredths, and thousandths of the resistor column 21. In this particular example the summing amplifier 22 has a feedback resistance of 500 ohms and as well known the gain of this amplifier equals the feedback resistance divided by the input resistance. Referring only to the resistor column 21, if a hole in the first column 14 were provided only at the zero row, then only the resistor 21.0 would be in the circuit as an input resistance to this amplifier 22. The gain would be 500 divided by 12,500 and hence the gain would be 0.04. If only one hole is provided in the first column 14 so that contact 16.1 engages contact 17.1, then only resistor 21.1 will be connected on the amplifier input. Since this is a 25,000 ohm resistor the gain of the amplifier will be 0.02. If the appropriate hole is punched in the card so that only resistor 16.2 is connected in the circuit, this resistor being 50,000 ohms will establish a gain of 0.01. Accordingly, the column of Table A which is designated hole location dictates the location of the hole or holes in the appropriate row required to achieve that particular value of input resistance and accordingly that particular value of gain as set forth in other columns of Table A. Also the Table A shows that if a hole location is at row 12, then there will be a plus value of the influence coefficients and if a hole is punched in the eleventh row, this will be a negative value for the influence coefficients.

The above code permits representing any value between 0 and 0.8090 within plus or minus 0.0005 of the true value. It will be noted that the output voltage is equal to 0.1 $a_k$ $x_k$ plus

TABLE A

| | Coefficient Value | Hole Location | Input R | Gain |
|---|---|---|---|---|
| S | | | | |
| I | + | 12 | | |
| G | − | 11 | | |
| N | | | | |
| T | 0.1 | 2 | 50K | 0.01 |
| E | 0.2 | 1 | 25K | 0.02 |
| N | 0.3 | 1 2 | 16.7K | 0.03 |
| T | 0.4 | 0 | 12.5K | 0.04 |
| H | 0.5 | 0 2 | 10K | 0.05 |
| S | 0.6 | 0 1 | 8.3K | 0.06 |
| | 0.7 | 0 1 2 | 7.14K | 0.07 |
| H | 0.01 | 6 | 500K | 0.001 |
| U | 0.02 | 4 | 250K | 0.002 |
| N | 0.03 | 4 6 | 167K | 0.003 |
| D | 0.04 | 4 5 | 125K | 0.004 |
| R | 0.05 | 3 | 100K | 0.005 |
| E | 0.06 | 3 6 | 83.3K | 0.006 |
| D | 0.07 | 3 4 | 71.4K | 0.007 |
| T | 0.08 | 3 4 6 | 62.5K | 0.008 |
| H | 0.09 | 3 4 5 | 55.5K | 0.009 |
| S | | | | |
| T | 0.001 | 9 | 3.33M | 0.00015 |
| H | 0.002 | 9 | 3.33M | 0.00015 |
| O | 0.003 | 8 | 2M | 0.00025 |

| | | | | | | |
|---|---|---|---|---|---|---|
| U | 0.004 | 8 | 9 | | 1.25M | 0.0004 |
| S | 0.005 | 7 | | | 1M | 0.0005 |
| A | 0.006 | 7 | 9 | | 0.77M | 0.00065 |
| N | 0.007 | 7 | 8 | | 0.67M | 0.00075 |
| D | 0.008 | 7 | 8 | | 0.67M | 0.00075 |
| T | 0.009 | 7 | 8 | 9 | 0.555M | 0.0009 |
| H | | | | | | |
| S | | | | | | |

the other terms. In other words the output voltages are scaled down by a factor of 10. This is a matter of choice of the feedback and input resistors for better operation of the summing amplifier. In FIG. 4 the gain values for the three decade groups have been indicated in the first column 14. These gain values are 4, 2 and 1 for the tenths decade group, 5, 2, 2, and 1 for the hundredths decade group and 5, 2.5 and 1.5 for the thousandths decade group. These gain values have also been shown in other columns on the card 12 of FIG. 4. These gain values make it easy for an operator to readily determine if the holes in the card are punched properly because this is a code which is based upon a decade or base 10 numeral system rather than a binary system for convenience to the average user. The code is a special binary coded decimal form.

In this preferred embodiment two rows, the 11th and 12th rows are used to designate the plus or minus sign of the voltage applied to the input of the summing amplifier 22. It is possible to use only a single row for this purpose, for example if row 11 has a hole therein, then the input voltage is negative. However, if row 11 does not have a hole therein, then the input voltage will be positive. This can be effected by a double throw switch or by a relay controlled by the sensing means sensing the presence or absence of a hole in row 11.

The individual resistors 21 are connected to the conductor buses 18 and 19 in parallel through the selected ones of the sensing contacts 16–17. A series connection is also possible with the various contacts 16–17 selectively shorting out different ones of the resistors 21. The resistor column 21 is that which establishes the variable resistance, and thus replaces a particular potentiometer of the parent case. This is a variable resistance setting apparatus which is automatically established as the card 12 is inserted in the card reader 11. Additionally, the summing amplifier 22 may be considered as being included in the variable resistance setting apparatus. Because of the combination of the feedback resistance and the variable input resistance, the amplifier 22 has a variable output current. This variable output current is determined by the variable input resistance and hence, the output of amplifier 22 is an amplified version of the current through the variable resistance 21.

Each resistor column may be connected to its own buffer amplifier, instead of including outputs from the other terms on conductors 24, thus providing a generalized replacement for coefficient potentiometers.

By utilizing the three decade groups, 10ths 100ths and 1,000ths, it is possible to select any resistance value represented between zero and 0.8090 within plus or minus 0.0005 of the true value. It is noted that this does not go all the way to 1.0 but this is easily compensated for by scaling all of the influence coefficients downward to have a maximum no greater than 0.8090. For example, all influence coefficients could be multiplied by 0.8. In effect this establishes 809 different resistance values within a value of one unit, and hence is accurate to within three decimal places while utilizing only a single column of the 80 columns on the card 12.

The prior art attempts utilized at least three columns in order to achieve this degree of accuracy in a variable resistance and hence the present invention is a considerable advance by using this particular code representing decade groups of tenths, hundredths and thousandths. The present invention thus makes it economically feasible to replace the ten turn potentiometers of the parent case with the card readers 11 and 11*a*. Not only is it economically feasible to do this but there is a definite saving of time in the setting up of the analog computer to run a particular set of response equation and there is also a definite advantage in the elimination of possible errors in the setting of the potentiometers of the parent case.

If all of the voltages to be used in a particular set of response equations are positive, then it is possible to eliminate the necessity for the 11th and 12th contacts 16.11 and 16.12 which determine the sign as shown in FIG. 5. In such case it is possible to use a coding or weighted value of the decade groups such that there are four resistors in each decade group for a total of 12 resistors 21 and to have a coding of five, two, two, and one in each decade group. This would be the same as that for the 100ths decade group. By so doing, any relative value from 1 to 1,000 in steps of one unit each would be possible to obtain.

Another coding form consisting of straight binary coding would also permit any relative value from one to one thousand to be obtained, using only ten of the 12 possible switch contacts. This binary code would be $2^n$R, where R is a resistance value of the first input resistor and of the feedback resistor, and $n$ is a number progressively from 0 through 9. This binary code permits more resistance combinations with ten resistors, but is much more difficult to check visually on a card 12 to see if the holes are punched correctly, and much more difficult to encode a particular value on the card.

It will be appreciated that the card reader 11 is a data reader to read data pre-established on some form of record medium. A record medium in this case is a thin cardboard card having holes therein with the holes establishing a gate closed condition, however, other forms of data readers and data record mediums may be used.

The feedback amplifier 22 is a summing amplifier which sums the conductance of the selected resistors of the respective resistor column. The resistors are selected of course by the gate closed condition which means the instance of a hole in a prepunched card 12.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A variable resistance setting apparatus, comprising, in combination, a data reader to read a pre-established data member establishing a plurality of desired resistance values, plural sensing means in said data reader arranged in columns and in rows with plural sensing means per row and plural sensing means per column and with each column corresponding to the columns on the data member to sense the difference between the gate open and gate closed conditions on the data member, a plurality of resistor columns each containing a plurality of resistors, said plurality of resistors of each resistor column being subdivided into first, second and third decade groups, the resistors in said second decade group having resistive values in the order of one decade higher than those in said first decade group and in the order of one decade lower than those in said third decade group, a resistor column for each of the plural sensing means columns in the data reader, first and second conductor buses, means connecting the individual resistors in a given resistor column to a respective one of a column of sensing means to establish a resistance variable in three decades to three significant figures determined by the cumulative value of the selected ones of the resistors in that resistor column, and said connecting means connecting the individual resistors in a given resistor column in series with a respective sensing means and with these series combinations being connected in parallel between said first and second buses.

2. A variable resistance setting apparatus, comprising, in combination, a data reader to read a pre-established data member establishing a plurality of desired resistance values, plural sensing means in said data reader arranged in columns and in rows with plural sensing means per row and plural sensing means per column and with each column corresponding to the columns on the data member to sense the difference between the gate open and gate closed conditions on the data member, a plurality of resistor columns each containing a plurality of resistors, said plurality of resistors of each resistor column being subdivided into first, second and third decade groups, the resistors in said second decade group having resistive values in the order of one decade higher than those in said first decade group and in the order to one decade lower than those in said third decade group, a resistor column for each of the plural sensing means columns in the data reader, means connecting the individual resistors in a given resistor column to a respective one of a column of sensing means to establish a resistance variable in three decades to three significant figures determined by the cumulative value of the selected ones of the resistors in that resistor column, a feedback amplifier having a feedback resistance and a gain determined by the ratio of said feedback resistance divided by the input resistance thereto, and means connecting said given resistor column to said feedback amplifier input.

3. A resistance setting apparatus as set forth in claim 2, including polarity means connecting at least one of said sensing means of each column to establish a plus or minus output of said feedback amplifier.

4. A resistance setting apparatus as set forth in claim 3, wherein said polarity means includes means connecting each sensing means column to either a positive or a negative voltage source to establish either a positive or negative input to said feedback amplifier.

5. A resistance setting apparatus as set forth in claim 2, wherein the resistors in said first decade group establish the gain and hence the effective resistance value of said feedback amplifier in tenths, said second decade group establishes the effective resistance value of said feedback amplifier in hundredths, and said third decade group establishes the effective resistance value of said feedback amplifier in thousandths to establish on the output thereof an effective resistance value accurate to three decimal places for the value of each resistor column.

6. A variable resistance setting apparatus, comprising, in combination, a data reader to read a pre-established data member establishing a plurality of desired resistance values, plural sensing means in said data reader arranged in columns and in rows with plural sensing means per row and plural sensing means per column and with each column corresponding to the columns on the data member to sense the difference between the gate open and gate closed conditions on the data member, a plurality of resistor columns each containing a plurality of resistors, said plurality of resistors of each resistor column being subdivided into first, second and third decade groups, the resistors in said second decade group having resistive values in the order of one decade higher than those in said first decade group and in the order of one decade lower than those in said third decade group, a resistor column for each of the plural sensing means columns in the data reader, means connecting the individual resistors in a given resistor column to a respective one of a column of sensing means to establish a resistance variable in three decades to three significant figures determined by the cumulative value of the selected ones of the resistors in that resistor column, and a feedback amplifier connected as a summing amplifier to sum the conductance of the selected resistors of each resistor column.

7. A variable resistance setting apparatus, comprising, in combination, a data reader to read a pre-established data member establishing a plurality of desired resistance values, plural sensing means in said data reader arranged in columns and in rows with plural sensing means per row and plural sensing means per column and with each column corresponding to the columns on the data member to sense the difference between the gate open and gate closed conditions on the data member, a plurality of resistor columns each containing a plurality of resistors, said plurality of resistors of each resistor column being subdivided into first, second and third decade groups, the resistors in said second decade group having resistive values in the order of one decade higher than those in said first decade group and in the order of one decade lower than those in said third decade group, a resistor column for each of the plural sensing means columns in the data reader, means connecting the individual resistors in a given resistor column to a respective one of a column of sensing means to establish a resistance variable in three decades to three significant figures determined by the cumulative value of the selected ones of the resistors in that resistor column, and polarity means connecting at least one of said sensing means of said respective one of said sensing means columns to establish a plus or minus output from said given resistor column.

8. A variable resistance setting apparatus, comprising, in combination, a data reader to read a pre-established data member establishing a plurality of desired resistance values, plural sensing means in said data reader arranged in columns and in rows with plural sensing means per row and plural sensing means per column and with each column corresponding to the columns on the data member to sense the difference between the gate open and gate closed conditions on the data member, a plurality of resistor columns each containing a plurality of resistors, said plurality of resistors of each resistor column being subdivided into first, second and third decade groups, the resistors in said second decade group having resistive values in the order of one decade higher than those in said first decade group and in the order of one decade lower than those in said third decade group, a resistor column for each of the plural sensing means columns in the data reader, and means connecting the individual resistors in a given resistor column to a respective one of a column of sensing means to establish a resistance variable in three decades to three significant figures determined by the cumulative value of the selected ones of the resistors in that resistor column, and polarity means to apply only a single polarity voltage to said given resistor column.

* * * * *

PO-1050
(5/69)

UNITED STATES PATENT OFFICE
CERTIFICATE OF CORRECTION

Patent No. 3,763,354 Dated October 2, 1973

Inventor(s) William E. Claxton and Harold C. Holden

It is certified that error appears in the above-identified patent and that said Letters Patent are hereby corrected as shown below:

In the Abstract, line 8, "gruops" should read --groups--.

*In Column 3, Line 27, "respone" should read --response--.

In Column 5, Line 64, "($x_i$ = o,i= 1 .. 0.5)" should read --($x_i$ = o,i= 1 ....5)--

In Column 5, Line 68, "flue" should read --five--.

In Column 13, Line 49, "to" should read --of--.

In Column 12, Line 11, "equation" should read --equations--.

Signed and sealed this 31st day of December 1974.

(SEAL)
Attest:

McCOY M. GIBSON JR.
Attesting Officer

C. MARSHALL DANN
Commissioner of Patents